United States Patent
Krstic et al.

(10) Patent No.: US 8,631,482 B2
(45) Date of Patent: Jan. 14, 2014

(54) METHOD FOR MANAGING COMPUTER RESOURCES ACCESSED BY A PROGRAM OPERATING IN A RESTRICTED ENVIRONMENT

(75) Inventors: Ivan Krstic, Sunnyvale, CA (US); Austin G. Jennings, Santa Clara, CA (US); Jacques Anthony Vidrine, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 642 days.

(21) Appl. No.: 12/790,451

(22) Filed: May 28, 2010

(65) Prior Publication Data

US 2011/0296515 A1    Dec. 1, 2011

(51) Int. Cl.
*H04L 29/06*    (2006.01)

(52) U.S. Cl.
USPC ................................ 726/10; 726/2; 726/27

(58) Field of Classification Search
USPC ............................................. 726/9–20, 2, 27
See application file for complete search history.

(56) References Cited

U.S. PATENT DOCUMENTS

| | | | | |
|---|---|---|---|---|
| 5,455,953 | A * | 10/1995 | Russell | 710/266 |
| 7,188,358 | B1 * | 3/2007 | Hisada et al. | 726/2 |
| 7,818,792 | B2 * | 10/2010 | Shamsaasef et al. | 726/10 |
| 8,239,928 | B2 * | 8/2012 | Huang et al. | 726/10 |
| 8,286,230 | B2 * | 10/2012 | Simmons | 726/10 |
| 2004/0088576 | A1 * | 5/2004 | Foster et al. | 713/201 |
| 2006/0090192 | A1 | 4/2006 | Corby et al. | |
| 2006/0288404 | A1 | 12/2006 | Kirshnan et al. | |
| 2007/0006156 | A1 | 1/2007 | Gerder et al. | |
| 2008/0127292 | A1 * | 5/2008 | Cooper et al. | 726/1 |

* cited by examiner

*Primary Examiner* — Amare F Tabor
(74) *Attorney, Agent, or Firm* — Womble Carlyle Sandridge & Rice LLP

(57) ABSTRACT

A resource manager of an operating system of a data processing system receives a first request from a first program for a ticket for accessing at least one of resources of the data processing system. In response to the first request, the resource manager determines whether the first program is entitled to access the resource. The ticket for accessing the resource is issued to the first program if the first program is entitled to access the resource. The ticket can be used by a second program to obtain rights to access the resource by acquiring the ticket from the first program, where the second program would not otherwise be entitled to access the resource based on a security profile associated with the second program.

25 Claims, 7 Drawing Sheets

METHOD FOR MANAGING COMPUTER RESOURCES ACCESSED BY A PROGRAM OPERATING IN A RESTRICTED ENVIRONMENT

FIELD OF THE INVENTION

Embodiments of the invention relate generally to the field of secure computing; and more particularly, to managing computer resources accessed by a program operating in a restricted operating environment.

BACKGROUND

Security concerns for all types of processor-based electronic devices, and particularly for computing devices, have become significant. While some concerns may relate to detrimental actions which may be undertaken by defective code implemented by such devices, the greater concerns relate to the ramifications of various types of attacks made upon such devices through malicious code, including code conventionally known in the field by a number of names, such as "viruses", "worms", "Trojan horses", "spyware", "malware", and others. Such malicious code can have effects ranging from relatively benign, such as displaying messages on a screen, or taking control of limited functions of a device; to highly destructive, such as taking complete control of a device, running processes, transmitting and/or deleting files, etc. Virtually any type of imaginable action on a processor-based device has been the subject of attacks by malicious code.

Many of these attacks are directed at computing devices, such as workstations, servers, desktop computers, notebook and handheld computers, and other similar devices. Many of these computing devices can run one or more application programs which a user may operate to perform a set of desired functions. However, such attacks are not limited to such computing devices. A broader group of various types of devices, such as cell phones; personal digital assistants ("PDAs"); music and video players; network routers, switches or bridges; and other devices utilizing a microprocessor, microcontroller, or a digital signal processor, to execute coded instructions have been the subjects of attacks by malicious code.

A number of methodologies have been used in an attempt to reduce or eliminate both the attacks and influence of malicious or defective code. Generally, these methodologies include detection, prevention, and mitigation. Specifically, these methodologies range from attempts to scan, identify, isolate, and possibly delete malicious code before it is introduced to the system or before it does harm (such as is the objective of anti-virus software, and the like), to restricting or containing the actions which may be taken by processes affected by malicious or defective code. However, such restrictions typically are configured statically. Such static configurations may not be flexible enough under certain circumstances.

SUMMARY OF THE DESCRIPTION

According to one aspect of the invention, a resource manager of an operating system of a data processing system receives a first request from a first program for a ticket for accessing at least one resource in the data processing system. In response to the first request, the resource manager determines whether the first program is entitled to access the resource. The ticket for accessing the resource is issued to the first program if the first program is entitled to access the resource. The ticket can be used by a second program to obtain rights to access the resource by acquiring the ticket from the first program, where the second program would not otherwise entitled to access the resource based on a security profile associated with the second program. The security profile includes information specifying a privilege or restriction of the second program for accessing the resources of the data processing system.

According to another aspect of the invention, a first program determines whether a second program should be permitted to access a resource of the data processing system, where the second program is restricted in a sandboxed operating environment that is not entitled to access the resource. If it is determined that the second program should be permitted to access the resource, the first program transmits a request to a resource manager running within a kernel of an operating system of the data processing system for a ticket to acquire rights to access the resource. In response to the ticket received from the resource manager, the first program transmits the ticket to the second program, such that the second program is enabled to access the resource with the ticket that it otherwise would not be entitled to. The ticket includes information that identifies the resource and one or more rights indicating how the resource should be accessed.

According to a further aspect of the invention, a first program receives a ticket from a second program for accessing a resource of a data processing system. The ticket includes information that identifies the resource and one or more rights indicating how the resource should be accessed. The second program acquired the ticket from a resource manager executed within a kernel of the data processing system. In response to the ticket, the first program transmits a request for permission to a resource manager for accessing the resource, where the request includes the ticket. The first program is restricted in a sandboxed operating environment that is not entitled to access the resource. In response to the permission received from the resource manager, the first program accesses the resource according to the rights specified by the ticket, such that the sandboxed operating environment of the first program is temporarily expanded to allow accessing the resource.

Other features of the present invention will be apparent from the accompanying drawings and from the detailed description which follows.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
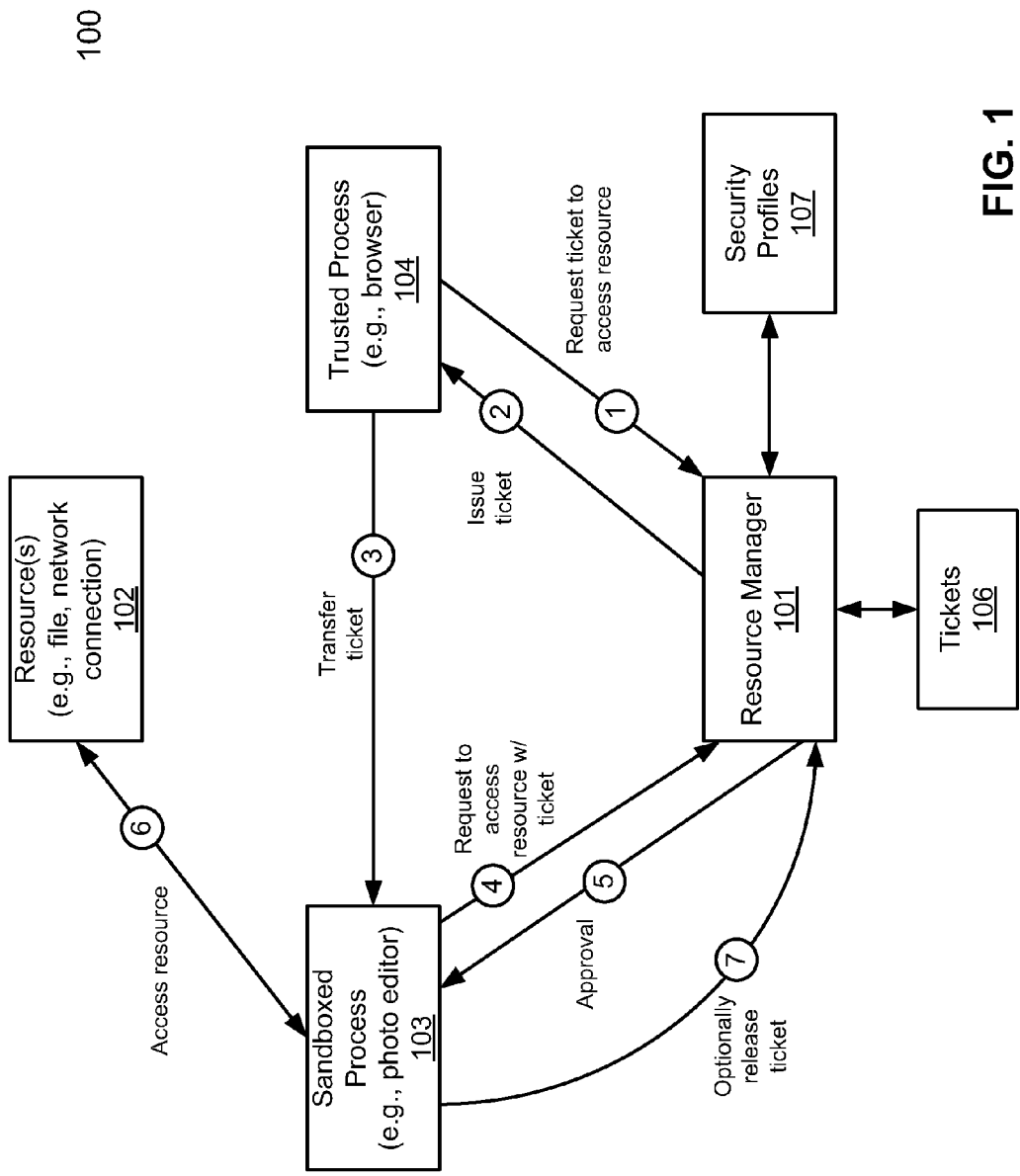
FIG. 1 is a block diagram illustrating a system for managing resources accessed by a program in a restricted operating environment according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

A program or application that operates in a restricted operating environment may be statically configured to access certain limited resources, such as files or network resources. Such a program when executed within the corresponding restricted operating environment is referred to herein as a sandboxed process and the restricted operating environment is referred to herein as a sandbox. Typically, the configuration of a sandbox is statically configured and stored in a security profile associated with the program. When the program is executed as a sandboxed process at runtime, the sandboxed process can only access the resources according to those specified in the corresponding security profile.

In one embodiment, a ticket system is utilized to provide an access right to a program to access a particular resource at runtime under certain circumstances, in which the program may not otherwise be entitled to access according to its security profile. For example, a first program may need to invoke a second program to access a particular resource, where the second program is not entitled to access that particular resource according to a security profile of the second program. In this situation, the first program may request from a resource manager or ticket authority a ticket for accessing that particular resource. The first program may be a trusted or privileged program with respect to the resource manager, such as a part of an operating system (OS) of a data processing system. Alternatively, the first program may just be another sandboxed program that is allowed to access the resource based on its own security profile.

In response to the request, the resource manager may determine whether the first program is entitled to access the resource, for example, based on the corresponding security profile of the first program. If the first program is a trusted or privileged program or certified by the resource manager, by default, the first program may be entitled to access certain resources in the system. If it is determined that the first program is entitled to access the resource, a ticket is issued to the first program. In one embodiment, the ticket includes information identifying that particular resource to be accessed and/or one or more access rights (e.g., read, write, or read/write) to the resource.

The first program may then transfer (e.g., via an interprocess call or IPC) the ticket to the second program and invoke the second program to access the resource. When the second program receives the ticket, the second program can then request permission from the resource manager (or an access monitor that monitors accesses of resources within the data processing system) by providing the ticket as a proof that the second program is now entitled to access the resource.

In response to the request, the resource manager examines the ticket to determine whether the ticket authorizes certain access rights to the resource. If so, the resource manager may grant the permission and allow the second program to access the resource according to one or more access rights specified in the ticket. In one embodiment, once a ticket is issued, it remains valid until the system reboots or a predetermined condition or event is satisfied or triggered. Alternatively, a ticket may be valid for a predetermined period of time, where when the predetermined period time lapses, the ticket may automatically become invalid. As a result, although initially the second program is not entitled (e.g., sandboxed) to access a particular resource based on its security profile, by possessing a proper ticket (obtained from another entity or broker), the second program acquires the temporary access rights for accessing that particular resource. This in effect expands the sandbox of the second program to temporarily cover that particular resource, thus temporarily allowing the second program to access the resource.

One of the main motivations for having a sandbox is to prevent a malicious, compromised, or malfunctioning application from accessing a resource that is owned by or associated with another application or the OS. Embodiments of the invention described throughout this application allow such a security feature to be maintained while also allowing a sandboxed process to have an exception or extension to temporarily access a particular resource that it would not otherwise be entitled to. For the purposes of illustration, "an application" and "a program" are interchangeable terms throughout this application, representing an executable file, which can be executed in a memory by a processor as one or more processes (e.g., instances). Each process may be associated with a sandbox or alternatively, multiple instances of processes executed from the same application or program may share the same sandbox.

FIG. 1 is a block diagram illustrating a system for managing resources accessed by a program in a restricted operating environment according to one embodiment of the invention. For example, system 100 may represent any kind of computer systems or electronic devices. Referring to FIG. 1, system 100 includes resource manager 101 configured to manage one or more resources 102 of system 100. Resource manager 101 may be one of the core components of an operating system (OS), which may be any kind of operating systems, such as the iPhone™ OS or Mac OS X™ from Apple Inc. of Cupertino, Calif., a Windows™ operating system from Microsoft Corporation of Redmond, Wash., or alternatively a Linux or UNIX operating system. Resources 102 may represent any kind of resources in a data processing system or electronic device, such as, for example, memories, inputs/outputs (IOs), buses, storage, files, network connections (e.g., sockets, ports, or network addresses), inter-process communications channels (e.g., UNIX domain sockets or Mach ports), etc.

In addition, system 100 includes one or more processes 103 and 104 that are executed from one or more programs or applications. In this example, process 103 is a sandboxed process while process 104 is a trusted or privileged process. A sandboxed process refers to a process that has been restricted within a restricted operating environment (e.g., sandbox) that limits the process to a set of predefined resources. Each sandboxed process may be associated with a set of dedicated system resources, such as, for example, a dedicated memory space, a dedicated storage area, or a virtual machine, etc. One of the purposes of sandboxing an application is to isolate the application from accessing other unnecessary or unrelated system resources of another application or a system component, such that any damage caused by the application would not spill over to other areas of system 100.

To provide security, an application may be "contained" by restricting its functionality to a subset of operations and only allowing operations that are necessary for the proper operation, i.e., operation according to its intended functionality. One method to implement a limited set of policies for each application is to contain, or "sandbox" the application. Sandboxing of an application or process can be achieved using operating system level protection to provide containment and to enforce security policies, such as policies that restrict the ability of the application to take actions beyond those functions needed for it to provide its intended functionalities.

When an application has been sandboxed during execution, the application is executed as a sandboxed process or thread within the system that is contained within a sandbox (also referred to as an application container), in which it cannot access certain system resources or another territory (e.g., sandbox) of another application, subject to a security profile associated with the sandboxed application, which is referred to as a sandboxed process or a sandboxed application.

A sandboxed process is the application or other program for which security containment will be implemented. In many cases, a sandboxed process is a user application, but it could be another program implemented on the computing device such as a daemon or a service. To increase security and provide an efficient mechanism, portions of the security system are implemented or executed in a kernel space. In addition, a monitor process module (not shown) is executed in a separate memory space from the sandboxed processes to further insulate them from each other. In particular, a sandboxed process is restricted from accessing memory outside of its process space and is further prohibited from spawning a non-sandboxed process. For example, a security profile of a sandboxed process may include a rule or policy that denies the sandboxed process from using certain system calls, which may be a mechanism that allows processes to alter each other's address spaces.

A security profile (also simply referred to as a profile) can include one or more policies, where a policy is a logical expression of a permissive or restrictive action that a sandboxed process may or may not take. For example, one policy may expressly allow a mail application to access an email database. In such an example, all other actions may be implicitly denied. In some situations, a default policy is available in a security profile, such that if none of the expressed permissive policies are applicable, then the default policy (typically denial of the operation) is applied. A security profile may be associated with a sandboxed process. Alternatively, a security policy is associated with more than one sandboxed process, such as when a system-wide or global security policy is implemented. Individual security profiles may be associated with distinct instances or instantiations of applications or daemons. For example, if a user executes more than one image of an application, each image may have a corresponding security profile.

In some embodiments a policy may prevent a program from performing certain actions based on the state of an external accessory connected to the computing device, e.g. if an accessory of a specific type or identity is connected; is disconnected, or is connected and is in (or is not in) a specific mode. For example, an application may only be allowed to communicate over an externally accessible data bus if an accessory that meets certain criteria is connected to the data bus and is in a receptive mode. Further detailed information concerning sandboxing techniques can be found in co-pending U.S. patent application Ser. No. 11/462,680, filed Aug. 4, 2006, which has been assigned to a common assignee of the present application and is incorporated by reference herein in its entirety.

Referring back to FIG. 1, it is assumed that process 103 has been sandboxed and it is not entitled to access resource 102 based on a security profile stored as part of security profiles 107. Security profiles 107 are statically precompiled profiles, each corresponding to a program installed in system 100. In order for process 103 to access resource 102, another process or entity, in this example, process 104 may be used as a broker or agent to acquire a ticket from resource manager 101 for accessing resource 102. Process 104 may be trusted or privileged process that is entitled to access resource 102. For example, process 104 may be a process executed from an application that is distributed by the same vendor of the operating system (e.g., as a certified component or agent). Alternatively, process 104 may just be another sandboxed process that is entitled to access resource 102 based on its corresponding security profile. Processes 103-104 may be running at a user level of the operating system while resource manager 101 may be running at a kernel level of the operating system.

In one embodiment, in order to enable process 103 to access resource 102, process 104 transmits a request to resource manager 101 for a ticket to access resource 102 via path (1). The request may include information identifying resource 102 (e.g., resource identifier) and/or one or more rights (e.g., access types such as read, write, or both) for accessing the resource. In response to the request for ticket, resource manager 101 determines whether process 104 is entitled to access resource 102. If process 104 is a trusted or privileged process, by default, resource manager 101 may assume that process 104 is entitled to access resource 102. Alternatively, resource manager 101 may examine a security profile associated with processor 104 in view of the request for ticket to determine whether process 104 is entitled to access resource 102.

If it is determined that process 104 is entitled to access resource 102, according to one embodiment, resource manager 101 issues a ticket to process 104 via path (2). The ticket may include a resource identifier identifying resource 102 and/or optional one or more rights (e.g., read, write, or both) specifying how resource 102 should be accessed. Once process 104 receives the ticket from resource manager 101, process 104 may transfer the ticket to process 103 and invoke process 103 to access resource 102 via path (3). The ticket may be transferred via an inter-process communication mechanism, such as a UNIX domain socket or Mach port.

In response to the ticket received from process 104, process 103 transmits a request to resource manager 101 for permission to access resource 102 via path (4). The request for permission includes the ticket received from process 104, as well as a process identifier (ID) that identifies process 103. Here, the ticket is used as a proof that process 103 is entitled to access resource 102 at that point in time. In response to the request, resource manager 101 examines the ticket to determine whether the ticket was specifically issued for accessing resource 102 and to determine the rights authorized by the ticket. If the ticket gives one or more rights to access resource 102, resource manager 101 returns an approval to process 103 via path (5) and allows process 103 to access resource 102 according to one or more rights specified by the ticket via path (6).

As a result, process 103 is enabled, via the ticket, to access resource 102 that would not otherwise be entitled based on a security profile associated with process 103. By issuing a ticket, resource manager 101 creates an exception at runtime to allow process 103 to temporarily access a resource that it would not be entitled based on the static security profile of process 103. This in effect expands the sandbox of process 103 to cover resource 102.

In one embodiment, a ticket may remain valid until the system reboots. Alternatively, a ticket may be valid for a predetermined period of time and upon the expiration of the predetermined period of time, the ticket may automatically become invalid. Furthermore, referring back to FIG. 1, after accessing resource 102, process 103 may expressly abandon the ticket by sending a request to release or terminate the ticket via path (7). In response, resource manager 101 may destroy or invalidate the ticket, such that the ticket can no longer be used to access resource 102. In a further embodiment, a ticket may further identify one or more process IDs identifying one or more processes that can use the ticket. In this embodiment, when process 104 requests the ticket, process 104 may further identify which process or processes intend to use the ticket. That is, the ticket cannot be used by other unintended processes for the purpose of accessing resource 102. Further, according to another embodiment, a ticket may specify one or more access rights for multiple resources, same type or different types.

The techniques described herein can be utilized in a variety of situations. For example, process 103 may be a photo editing application that has been configured, via its security profile, to not be allowed to access a photo file representing resource 102. When a user browses certain photo files via a browser application representing process 104, he may choose to invoke the photo editing application 103 directly from browser application 104. Since photo editing application 103 has been configured as a sandboxed application and cannot access photo file 102 based on its security profile, browser application 104 may request a ticket from resource manager 101 to allow photo editing application 103 to temporarily access photo file 102 using some of the techniques described above.

Figure 2:
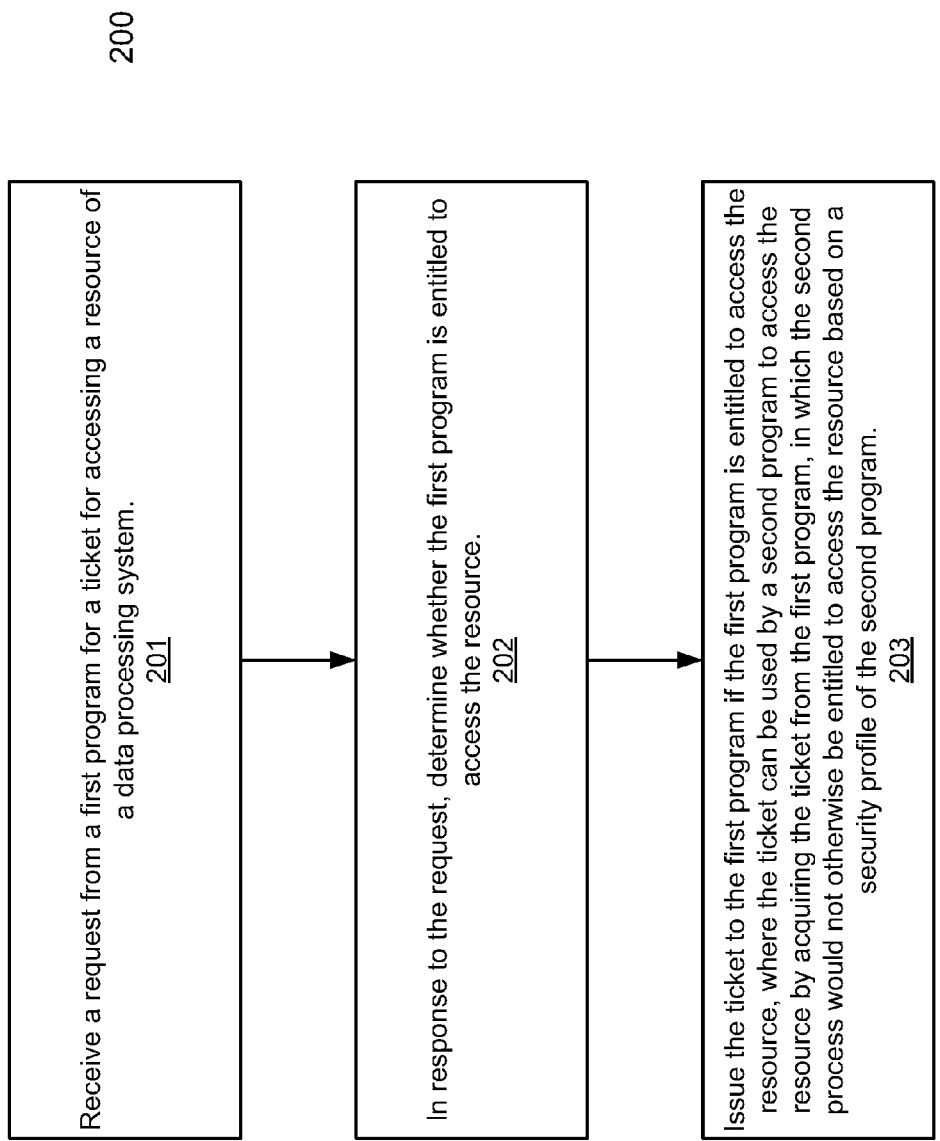
FIG. 2 is a flow diagram illustrating a method for managing resources according to one embodiment of the invention.

FIG. 2 is a flow diagram illustrating a method for managing resources according to one embodiment of the invention. For example, method 200 may be performed by resource manager 101 of FIG. 1. Referring to FIG. 2, at block 201, a request is received from a first program requesting for a ticket for accessing a resource of a data processing system. In response to the request, at block 202, it is determined whether the first program is entitled to access the resource. The first program may be a trusted program, in which case, by default it can be assumed that the first program can access the resource. Alternatively, the first program may be another sandboxed program, in which case, the resource manager may examine a security profile of the first program to determine whether it can access the resource. If it is determined that the first program is entitled to access the resource, at block 303, the ticket is issued to the first program. The ticket can then be used by a second program (e.g., sandboxed program) to access the resource by acquiring the ticket from the first program, in which the second program would not otherwise be entitled to access the resource based on its security profile.

Figure 3:
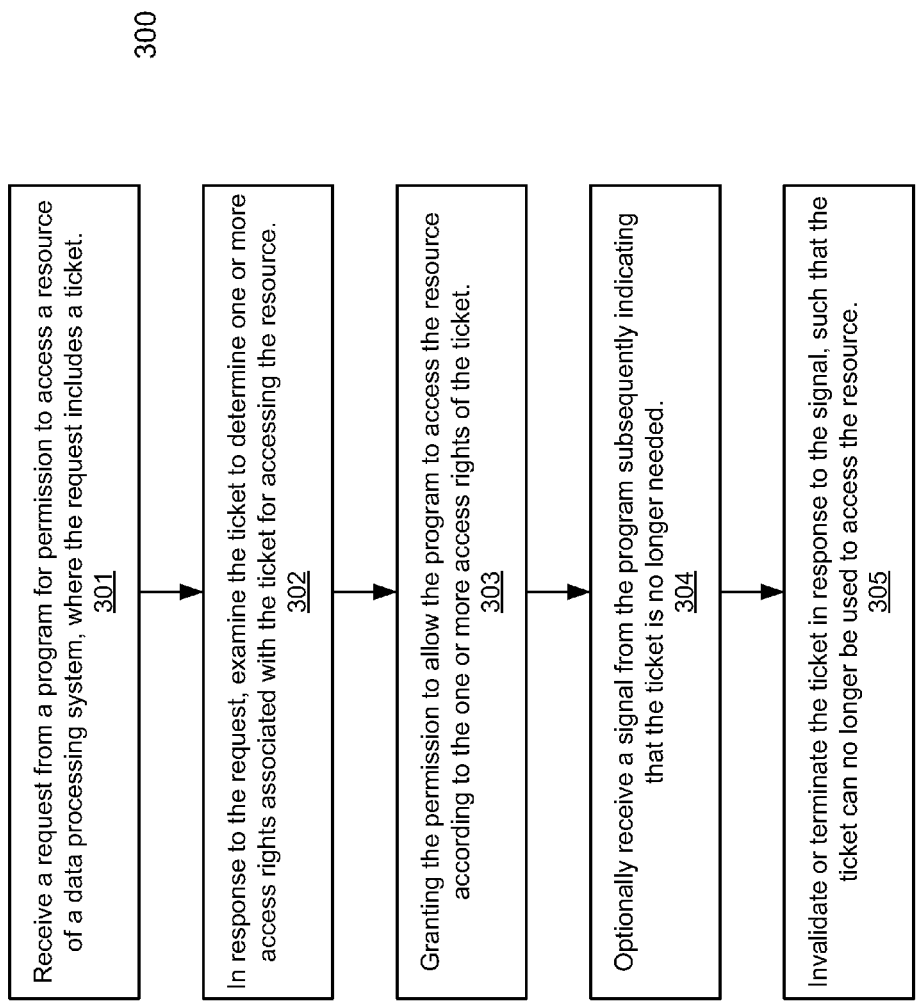
FIG. 3 is a flow diagram illustrating a method for managing resources according to one embodiment of the invention.

FIG. 3 is a flow diagram illustrating a method for managing resources according to one embodiment of the invention. For example, method 300 may be performed by resource manager 101 of FIG. 1. Referring to FIG. 3, at block 301, a request is received from a program requesting a permission to access a resource of a data processing system, where the request includes a ticket. The program may be a sandboxed program that acquires the ticket from another program, which may be a trusted or privileged program that obtains the ticket from a resource manager. In response to the request for permission, at block 302, the ticket is examined to determine one or more access rights associated with the ticket for accessing the resource. At block 303, the permission is granted to the program to allow the program to access the resource according to the one or more access rights specified in the ticket. Optionally, at block 304, a signal is subsequently received from the program indicating that the ticket is no longer needed. In response to the signal, at block 305, the ticket is terminated or invalidated, such that the ticket can no longer be used for the purpose of accessing the resource.

Figure 4:
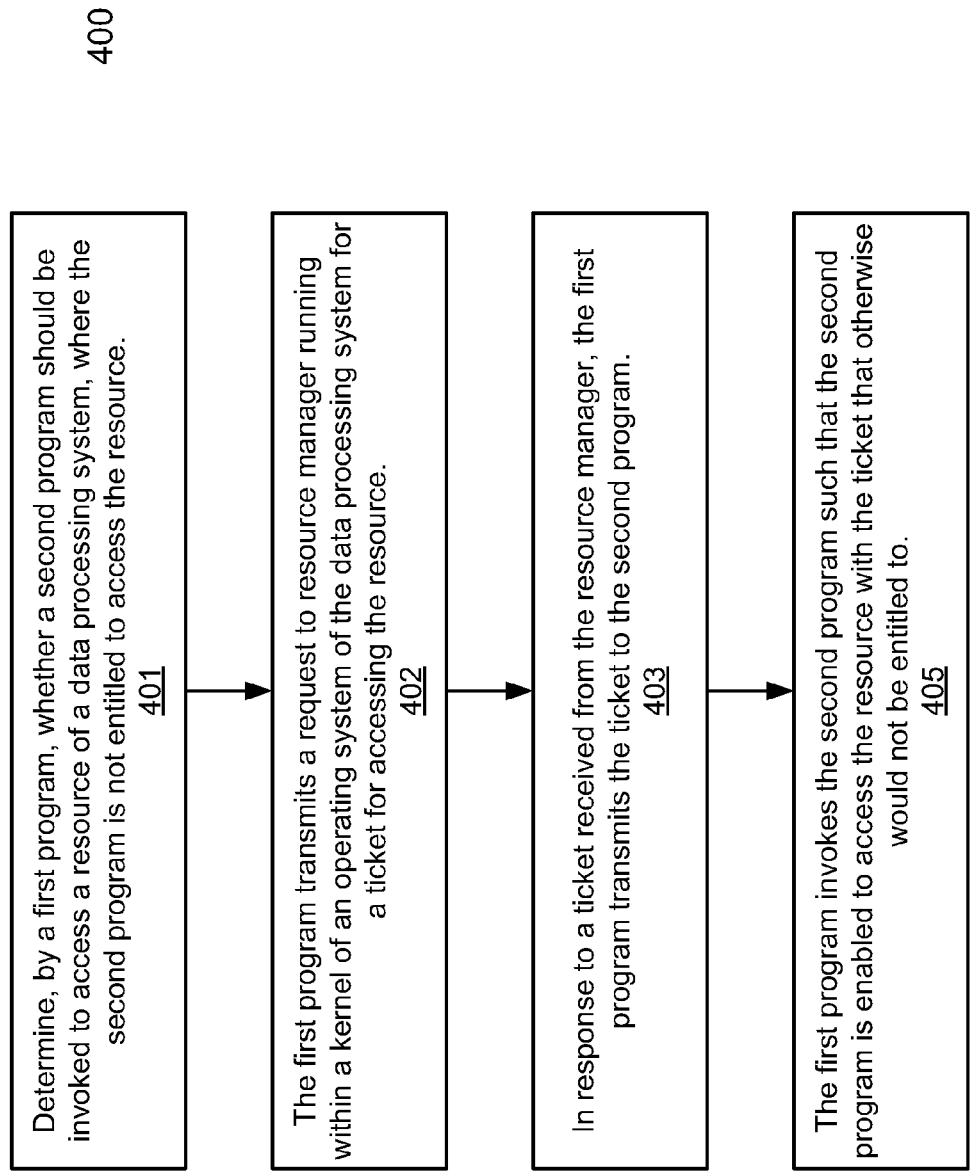
FIG. 4 is a flow diagram illustrating a method for accessing a resource in a restricted operating environment according to one embodiment of the invention.

FIG. 4 is a flow diagram illustrating a method for accessing a resource in a restricted operating environment according to one embodiment of the invention. For example, method 400 may be performed by process 104 of FIG. 1. Referring to FIG. 4, at block 401, a first program determines whether a second program should be invoked to access a resource of a data processing system, where the second program is not entitled to access the resource. For example, the second program may be a sandboxed program that is not entitled to access the resource based on its security profile. If so, at block 402, the first program transmits a request to a resource manager running within a kernel of an operating system of the data processing system for a ticket to access the resource. In response to the ticket received from the resource manager, the first program transfers the ticket to the second program. At block 404, the second program is invoked to access the resource using the ticket that would not otherwise be entitled to.

Figure 5:
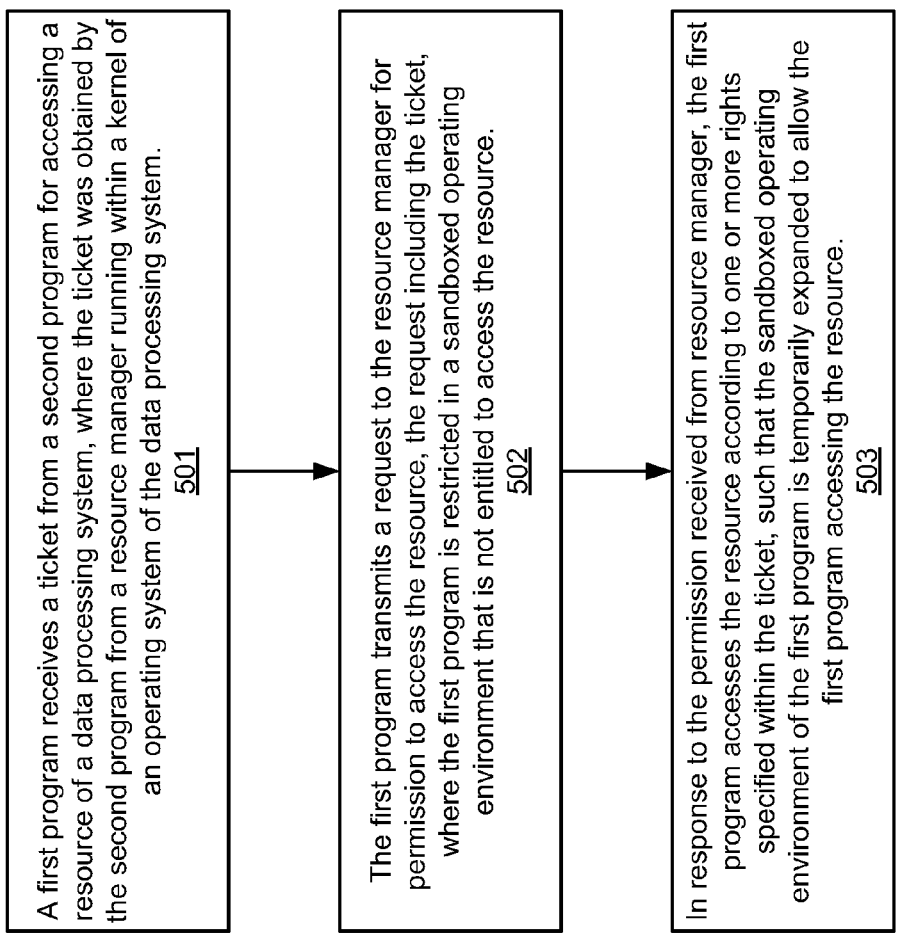
FIG. 5 is a flow diagram illustrating a method for accessing a resource in a restricted operating environment according to one embodiment of the invention.

FIG. 5 is a flow diagram illustrating a method for accessing a resource in a restricted operating environment according to one embodiment of the invention. For example, method 500 may be performed by process 103 of FIG. 1. Referring to FIG. 5, at block 501, a first program receives a ticket from a second program for accessing a resource of a data processing system. The ticket was obtained by the second program from a resource manager running within a kernel of an operating system of the data processing system. At block 502, the first program transmits a request to the resource manager for permission to access the resource, where the request includes the ticket. The first program is restricted in a sandboxed operating environment that is not entitled to access the resource based on its security profile. In response to the permission received from the resource manager, at block 503, the first program accesses the resource according to one or more rights specified in the ticket. As a result, the sandboxed operating environment of the first program is temporarily expanded to allow the first program accessing the resource.

Figure 6:
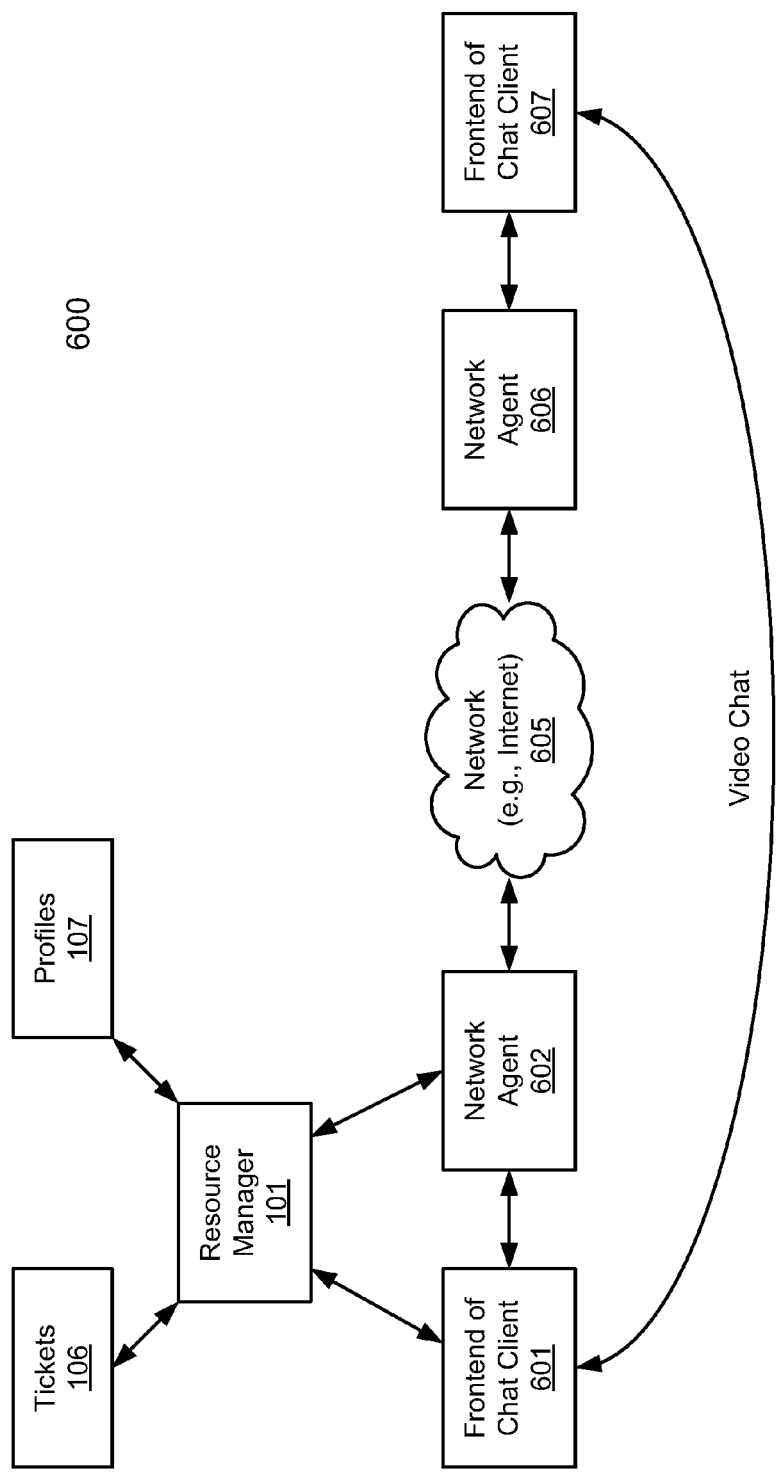
FIG. 6 is a block diagram illustrating a network configuration in which the ticketing technology can be applied according to one embodiment of the invention.

As described above, a resource can be any one of a variety of resources. For example, a resource can be a network resource such as a network address (e.g., IP address and/or port). FIG. 6 is a block diagram illustrating a network configuration in which the ticketing technology can be applied according to one embodiment of the invention. Referring to FIG. 6, network configuration 600 represents an instance messenger (IM) system such as iChat™ available from Apple Inc. In this example, referring to FIG. 6, a local IM application having frontend 601 and network agent 602 communicatively coupled to a remote IM application having frontend 604 and network agent 603 over network 605, which may be a local area network or a wide area network.

Typically, during regular IM communications, network agents 602 and 603 handle most of the network communications for frontends 601 and 604, respectively. In this configuration, frontend 601 may be configured as a sandboxed process that normally would not be entitled to access certain network resources, such as the IP address and port of remote frontend 604, because the underlying network communications should be handled by network agent 602. However, in some situations such as a video chat, frontend 601 needs to directly communicate with frontend 604 via the IP address and port of frontend 604.

It is assumed that network agent 602 is a trusted application (e.g., part of network stack of an operating system). In one embodiment, network agent 602 can request a ticket from resource manager 101 for accessing the IP address and port of frontend 604 and transfer the ticket to frontend 601 to allow frontend 601 to conduct the video chat by directly communicating with frontend 604, using some or all of the techniques described above. Once the video chat is over, the ticket may be invalidated or alternatively it may remain valid until reboot. Other configurations may also be applied.

Figure 7:
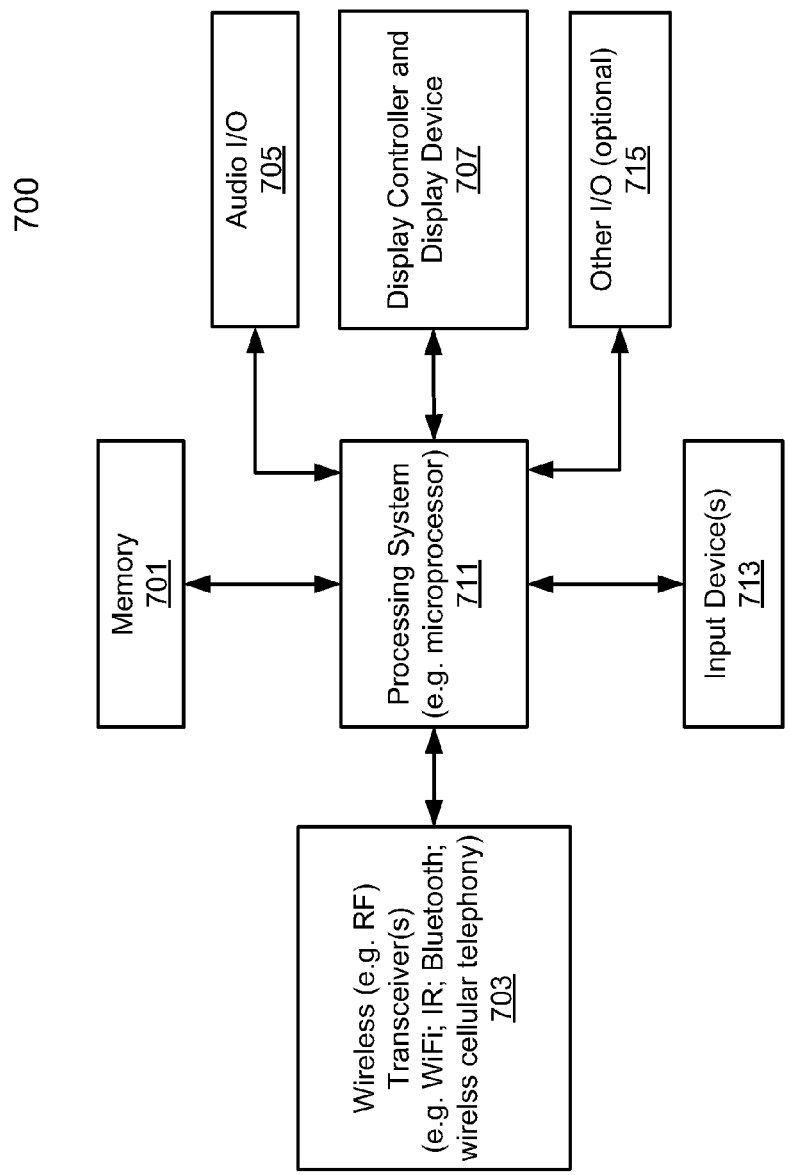
FIG. 7 shows an example of a data processing system which may be used with one embodiment of the present invention.

FIG. 7 shows an example of a data processing system which may be used with one embodiment of the present invention. For example, system 700 may be implemented as part of system 100 as shown in FIG. 1. The data processing system 700 shown in FIG. 7 can include processing system 711, which may include one or more microprocessors, processor cores, execution units, or functional units. Alternatively, processing system 711 may be a system on a chip of an integrated circuit (IC), such as application specific integrated circuit (ASIC). System 700 also includes memory 701 for storing data and programs for execution by the processing system. Memory 701 may be a volatile memory (e.g., random access memory (RAM) such as DRAM) or non-volatile memory (e.g., a flash memory device or a mass storage device such as hard disk). Memory 701 may represent a storage device that may be located locally and/or remotely over a network. System 700 can also include audio input/output subsystem 705, which may include a microphone and a speaker for, for example, playing back music or providing voice related functionality, such as telephone functionality, through the speaker and microphone.

A display controller and display device 707 can provide a visual user interface for the user; this interface may, for example, include a graphical user interface that is similar to that shown on an iPhone® device or on a Macintosh computer when running operating system software. Alternatively, the graphical user interface may be similar to any other interface used on alternative hardware platforms. System 700 can also include one or more wireless transceivers 703 to communicate with another data processing system. A wireless transceiver may be a WiFi transceiver, an infrared transceiver, a Bluetooth transceiver, and/or a wireless cellular telephony transceiver. It will be appreciated that additional components, not shown, may also be part of system 700 in certain embodiments, and in certain embodiments fewer components than shown in FIG. 7 may also be used in a data processing system.

Data processing system 700 can also include one or more input devices 713 which are provided to allow a user to provide input to the system. These input devices may be a keypad, a keyboard, a touch pad, a touch panel, or a multi touch panel. The data processing system 700 also includes an optional input/output device 715, which may be a connector for a dock, a network interface, a universal serial bus (USB) or Firewire™ interface, a high-definition multimedia interface (HDMI), etc.

It will be appreciated that one or more buses, not shown, may be used to interconnect the various components as is well known in the art. The data processing system shown in FIG. 7 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device. In other embodiments, the data processing system 700 may be a network computer or an embedded processing device within another device, or other types of data processing systems which have fewer components or perhaps more components than that shown in FIG. 7.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod®, or iPod Nano® media player from Apple Inc. of Cupertino, Calif., a touch screen or multi-touch input device, pushbutton device, movable pointing input device or other input device. The media selection device may be used to select the media stored on the storage device and/or a remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Further, at least certain embodiments of the inventions may be part of a multi-functional device, such as an iPhone™ device or iPad™ device available from Apple Inc.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the arts. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for managing resources accessed by a program in a restricted operating environment, the method comprising:
   receiving, at a resource manager of an operating system of a data processing system, a first request from a first program for a ticket that represents permission to access a resource of the data processing system;
   in response to the first request, determining, based upon a first security profile of the first program, one or more access rights indicating how the resource can be accessed by the first program,
   including, in the ticket, information that identifies the resource, and the one or more access rights indicating how the resource can be accessed by the first program;
   issuing the ticket for accessing the resource to the first program when the first program is entitled to access the resource;
   transferring the ticket that represents permission to access the resource to a second program,
   wherein the resource manager is configured to allow the second program to access the resource according to the one or more access rights specified in the ticket, the first program is a trusted program with respect to the resource manager, and the second program is a sandboxed program executed in a sandboxed environment that is configured to not otherwise be entitled to access the resource based on a second security profile associated with the second program.

2. The method of claim 1, further comprising:
   receiving, at the resource manager, a second request from the second program for permission to access the resource, the second request including the ticket;
   in response to the second request, examining the ticket to determine one or more rights associated with the ticket for accessing the resource; and
   granting the permission to the second program to allow the second program to access the resource according to the one or more rights of the ticket.

3. The method of claim 2, further comprising:
   receiving a third request from the second program indicating that the ticket is no longer needed; and
   in response to the third request, invalidating the ticket such that the ticket can no longer be used to access the resource.

4. The method of claim 1, wherein the one or more access rights include at least one of a right to read the resource or a right to write to the resource.

5. The method of claim 4, wherein the ticket is valid for a predetermined period of time, and wherein upon the predetermined period of time lapses, the ticket automatically becomes invalid.

6. The method of claim 4, wherein the ticket is valid until the data processing system reboots or a predetermined condition is satisfied.

7. The method of claim 1, wherein transferring the ticket comprises transferring the ticket via an inter-process communication mechanism.

8. The method of claim 1, wherein the second program is a first frontend of a local chat program and the first program is a first network agent associated with the local chat program that handles network communications with a second remote network agent of a second frontend of a remote chat program, wherein the resource includes a network address of the remote chat program, wherein the first frontend is not entitled to access the network address of the remote chat program, and wherein the first network acquires the ticket from the resource manager to be used by the first frontend of the local chat program, such that the first frontend can directly communicate with the second frontend without involving the first and second network agents of the local and remote chat programs.

9. A non-transitory machine-readable storage medium having instructions stored therein, which when executed by a machine, cause the machine to perform a method for managing resources accessed by a program in a restricted operating environment, the method comprising:
   receiving, at a resource manager of an operating system of a data processing system, a first request from a first program for a ticket that represents permission to access a resource of the data processing system;
   in response to the first request, determining, based upon a first security profile of the first program, one or more access rights indicating how the resource can be accessed by the first program including, in the ticket, information that identifies the resource, and the one or more access rights indicating how the resource can be accessed by the first program; and
   issuing the ticket for accessing the resource to the first program when the first program is entitled to access the resource;
   transferring the ticket to a second program,
   wherein the resource manager is configured to allow the second program to access the resource according to the one or more access rights specified in the ticket, the first program is a trusted program with respect to the resource manager, and the second program is a sandboxed program executed in a sandboxed environment that is configured to not otherwise be entitled to access the resource based on a second security profile associated with the second program.

10. The machine-readable storage medium of claim 9, wherein the method further comprises:
    receiving, at the resource manager, a second request from the second program for permission to access the resource, the second request including the ticket;

in response to the second request, examining the ticket to determine one or more rights associated with the ticket for accessing the resource; and granting the permission to the second program to allow the second program to access the resource according to the one or more rights of the ticket.

11. The machine-readable storage medium of claim 10, wherein the method further comprises:

receiving a third request from the second program indicating that the ticket is no longer needed; and in response to the third request, invalidating the ticket such that the ticket can no longer be used to access the resource.

12. The machine-readable storage medium of claim 9, wherein the one or more access rights include at least one of a right to read the resource or a right to write to the resource.

13. The machine-readable storage medium of claim 12, wherein the ticket is valid for a predetermined period of time, and wherein upon the predetermined period of time lapses, the ticket automatically becomes invalid.

14. The machine-readable storage medium of claim 12, wherein the ticket is valid until the data processing system reboots or a predetermined condition is satisfied.

15. The machine-readable storage medium of claim 9, wherein the ticket is transferred via an inter-process communication mechanism that includes at least a socket or a port.

16. The machine-readable storage medium of claim 9, wherein the second program is a first frontend of a local chat program and the first program is a first network agent associated with the local chat program that handles network communications with a second remote network agent of a second frontend of a remote chat program, wherein the resource includes a network address of the remote chat program, wherein the first frontend is not entitled to access the network address of the remote chat program, and wherein the first network acquires the ticket from the resource manager to be used by the first frontend of the local chat program, such that the first frontend can directly communicate with the second frontend without involving the first and second network agents of the local and remote chat programs.

17. A data processing system, comprising:

a processor; and a memory coupled to the processor for storing executable instructions, which when executed from the memory, cause the processor to receive, at a resource manager of an operating system of a data processing system, a first request from a first program for a ticket that represents permission to access a resource of the data processing system, in response to the first request, determine, based upon a first security profile of the first program, one or more access rights indicating how the resource can be accessed by the first program include, in the ticket, information that identifies the resource, and the one or more access rights indicating how the resource can be accessed by the first program, issue the ticket for accessing the resource to the first program when the first program is entitled to access the resource, transfer the ticket to a second program, wherein the resource manager is configured to allow the second program to access the resource according to the one or more access rights specified in the ticket, the first program is a trusted program with respect to the resource manager, and the second program is a sandboxed program executed in a sandboxed environment that is configured to not otherwise be entitled to access the resource based on a second security profile associated with the second program.

18. The system of claim 17, wherein in response to a second request having the ticket from the second program for permission to access the resource, the resource manager is configured to examine the ticket to determine one or more rights associated with the ticket for accessing the resource, and grant the permission to the second program to allow the second program to access the resource according to the one or more rights of the ticket.

19. A computer-implemented method for accessing resources of a data processing system, the method comprising:

determining, by a first program, whether a second program is needed to access a resource of the data processing system, wherein the second program is restricted in a sandboxed operating environment that is not entitled to access the resource;

transmitting a request to a resource manager running within a kernel of an operating system of the data processing system for a ticket that represents rights to access the resource, when it is determined that the second program is needed to access the resource, wherein the ticket includes information that identifies the resource and one or more access rights indicating how the resource can be accessed by the first program; and in response to receiving the ticket from the resource manager, transmitting the ticket to the second program, wherein the resource manager is configured to allow the second program to access the resource according to the one or more rights specified in the ticket, the first program is a trusted program with respect to the resource manager, and the second program is a sandboxed program executed in a sandboxed environment that is configured to not otherwise be entitled to access the resource based on a security profile associated with the second program.

20. The method of claim 19, wherein the second program is configured to communicate with the resource manager with the ticket to acquire a permission to access the resource, such that the sandboxed operating environment of the second program is temporarily expanded to allow accessing the resource.

21. The method of claim 19, wherein the ticket is valid for a predetermined period of time, and wherein upon the predetermined period of time lapses, the ticket automatically becomes invalid.

22. The method of claim 19, wherein the ticket is valid until the data processing system reboots or a predetermined condition is satisfied.

23. A computer-implemented method for accessing resources in a restricted operating environment, the method comprising:

receiving, by a first program, a ticket from a second program, the ticket representing permission to access a resource of a data processing system, the ticket including information that identifies the resource and one or more rights indicating how the resource can be accessed, wherein the second program acquired the ticket from a resource manager executed within a kernel of the data processing system, and the ticket includes information that identifies the resource and one or more access rights indicating how the resource can be accessed by the first program;

in response to receiving the ticket, transmitting a request for a permission to a resource manager for accessing the resource, the request including the ticket, wherein the resource manager is configured to send permission to the second program to access the resource according to the one or more rights specified in the ticket; and in response to receiving the permission from the resource manager, the first program accessing the resource according to the access rights specified by the ticket, wherein the second program is a trusted program with respect to the resource manager, and the first program is a sandboxed program executed in a sandboxed environment that is configured to not otherwise be entitled to access the resource based on a security profile associated with the first program.

24. The method of claim 23, wherein the ticket is valid for a predetermined period of time, and wherein upon the predetermined period of time lapses, the ticket automatically becomes invalid.

25. The method of claim 23, wherein the ticket is valid until the data processing system reboots or a predetermined condition is satisfied.

* * * * *